United States Patent
Kisakibaru et al.

(10) Patent No.: US 7,335,244 B2
(45) Date of Patent: Feb. 26, 2008

(54) AIR-PURIFYING DEVICE FOR A FRONT-OPENING UNIFIED POD

(75) Inventors: Toshirou Kisakibaru, Tokyo (JP); Makoto Okada, Tokyo (JP); Yasunori Horibe, Tokyo (JP)

(73) Assignees: Cambridge Filter Japan, Ltd., Tokyo (JP); Kondoh Industries, Ltd., Tokyo (JP)

( * ) Notice: Subject to any disclaimer, the term of this patent is extended or adjusted under 35 U.S.C. 154(b) by 329 days.

(21) Appl. No.: 11/027,439

(22) Filed: Dec. 30, 2004

(65) Prior Publication Data

US 2005/0268580 A1 Dec. 8, 2005

(30) Foreign Application Priority Data

Jun. 4, 2004 (JP) ............................. 2004-166606

(51) Int. Cl.
*B01D 46/00* (2006.01)

(52) U.S. Cl. ................... 55/385.6; 55/385.1; 55/385.2; 55/418; 55/471; 454/187; 454/192; 206/454; 206/710; 206/711

(58) Field of Classification Search .............. 55/385.6, 55/385.1, 385.2, 418, 471; 454/187, 192; 206/710, 711, 454

See application file for complete search history.

(56) References Cited

U.S. PATENT DOCUMENTS

| | | | | |
|---|---|---|---|---|
| 4,471,716 A | * | 9/1984 | Milliren | 118/500 |
| 4,967,295 A | * | 10/1990 | Yamauchi et al. | 360/97.02 |
| 5,207,548 A | * | 5/1993 | Suffel | 414/404 |
| 5,346,518 A | * | 9/1994 | Baseman et al. | 96/126 |
| 6,758,876 B2 | * | 7/2004 | Suzuki et al. | 55/385.6 |
| 2006/0266011 A1 | * | 11/2006 | Halbmaier et al. | 55/385.6 |

* cited by examiner

*Primary Examiner*—Duane Smith
*Assistant Examiner*—Minh-Chau T. Pham
(74) *Attorney, Agent, or Firm*—Bromberg & Sunstein LLP

(57) ABSTRACT

An air-purifying device for a front-opening unified pod to purify the air in it is provided. The air in the front-opening unified pod 51 is sucked through one of its breathing holes 58a and directed into an air-purifying device (M) that includes a fan-driving means 1, a dust-filtering means 2, and a chemical-filtering means 3. The moisture, chemical gases, and dust in the air are removed by the air-purifying device (M), and then the purified air is forced into the front-opening unified pod 51 through the other breathing hole 58b. Thus the air in the front-opening unified pod 51 is purified, and its purity is maintained by circulating the air.

3 Claims, 5 Drawing Sheets

AIR-PURIFYING DEVICE FOR A FRONT-OPENING UNIFIED POD

FIELD OF THE INVENTION

The present invention relates to an air-purifying device that removes the moisture and chemical gases from the inside of a front-opening unified pod (FOUP) that is used in a clean room of a mini-environment system, and which purifies the air of the FOUP.

DESCRIPTION OF THE PRIOR ART

The miniaturization of semiconductor-integrated circuits has changed the environment of production lines of wafers that are 300 mm in diameter. Clean rooms, in which conventional production lines were installed, have been changed from an entire-room system to a mini-environment system. Namely, the entire-room system has raised the grade of the cleanness of entire rooms, but the mini-environment system has raised the grade of cleanness of the limited area that surrounds wafers.

In reducing the initial investment and running costs, the mini-environment system lowers the cleanness of an entire room compared to a conventional system, and wafers are put in a hermetically-sealed container and then transported. The hermetically-sealed container for wafers is termed a front-opening unified pod (FOUP), and its specifications are standardized internationally.

However, an air-purifying device that removes the moisture and chemical gases from the air inside the FOUP, and which sucks the air from it and purifies the air and then causes the purified air to enter it again, is not used in practice, nor disclosed in any patent document.

The sealing performance of the FOUP, which is standardized internationally, is insufficient for moisture and chemical gases. When the FOUP is left in a conventional clean room for a long time, moisture and chemical gases in the clean room enter it through the holes for breathing furnished in the lower plate of it, and adhere to the surface of the wafers inside of it. That causes less wafers to be produced. This is one of the problems to be solved.

In some cases, since the wafers to which a film of organic materials adheres are in a FOUP, some components of the chemical gases from the organic materials adhere to the internal surface of the FOUP, and the components will again adhere to the surface of the wafers in the next process. That causes less wafers to be produced. This is another problem to be resolved.

Further, since the moisture enters the FOUP, it causes the surface of the wafers in the FOUP to form an oxidized film. This effect deteriorates the characteristics of an integrated circuit for a semiconductor, depending on the process. This is also another problem to be resolved.

DISCLOSURES OF THE INVENTION

To resolve the above-mentioned problems, the present invention is an air-purifying device that comprises a fan-driving means for driving a fan and its drive unit, a dust-filtering means that includes a cleaning filter for removing the dust, and a chemical-filtering means for removing the moisture and chemical gases. These means are installed in a casing, wherein a suction nozzle and a discharge nozzle are furnished on the upper part of it. A FOUP that is furnished with more than one breathing hole in its bottom plate is mounted on the air-purifying device. The suction nozzle and the discharge nozzle of the air-purifying device are connected to the breathing holes of the FOUP. When the air-purifying device is activated, the air in the FOUP is sucked via one of the breathing holes and goes into the air-purifying device through the suction nozzle. The air-purifying device removes the moisture, chemical gases, and dust from the air. Then the purified air, from which the moisture, chemical gases, and dust have been removed, is again blown into the FOUP via the discharge nozzle and another breathing hole. Thus the air is purified and its purity is maintained by being circulated between the front-opening unified pod and the air-purifying device.

In this invention, as described above, the air-purifying device sucks the air into the FOUP via one of the breathing holes that is furnished in its bottom plate, and causes it to enter the air-purifying device, which comprises the fan-driving means for driving a fan, the dust-filtering means for removing the dust, and the chemical-filtering means for removing the moisture and chemical gases, through the suction nozzle. Then the air-purifying device turns it into purified air by removing the moisture, chemical gases, and dust from it, and forces the purified air to enter the FOUP through another breathing hole. Thus the air is purified, and its purity is maintained by being circulated between the FOUP and the air-purifying device. Therefore, the air-purifying device can prevent the wafers from deteriorating because of chemical gases and the dust in a clean room. Consequently, it can contribute to increasing the percentage of the wafers produced and can contribute to improved productivity.

BEST MODE FOR CARRYING OUT THE INVENTION

An air-purifying device for a FOUP sucks the air in the pod via one of the breathing holes that are furnished in its bottom plate, and directs it into the air-purifying device, wherein the air-purifying device turns it into purified air by removing the moisture, chemical gases, and dust from it, and forces the purified air to enter the FOUP through another breathing hole. Thus the air can be purified, and its purity is maintained by being circulated between the FOUP and the air-purifying device.

THE FIRST EMBODIMENT OF THE INVENTION

Figure 1:
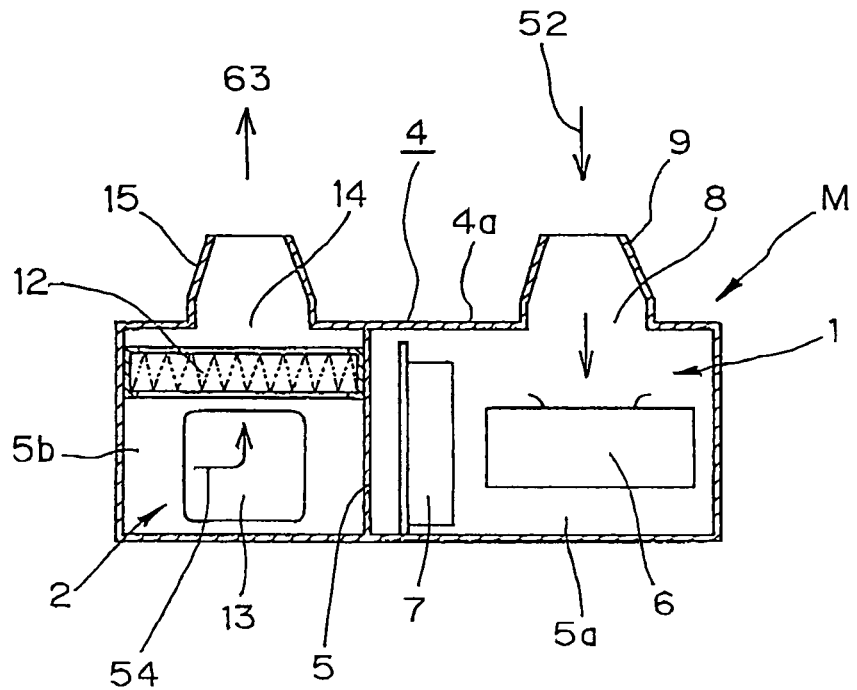
FIG. 1 is a front view of a longitudinal section of the first embodiment of the air-purifying device for the FOUP of the present invention.
Figure 2:
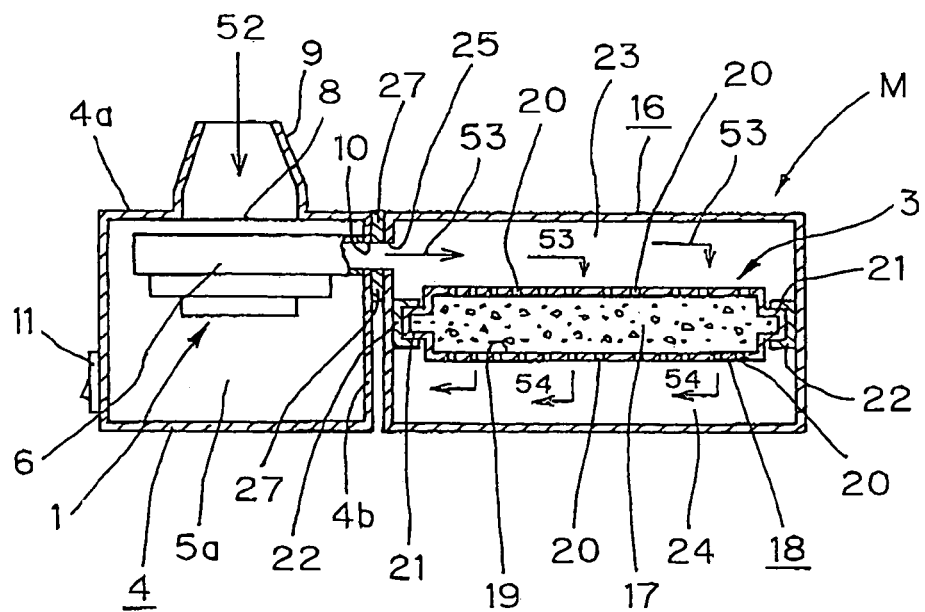
FIG. 2 is a right-side view of the longitudinal section of the above embodiment.
Figure 3:
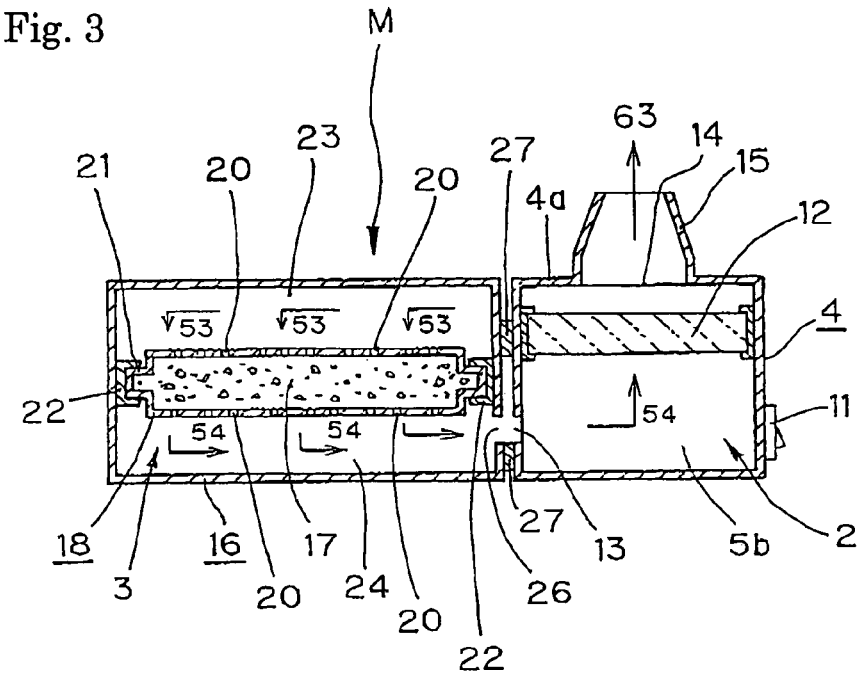
FIG. 3 is a left-side view of the longitudinal section of the above embodiment.
Figure 4:
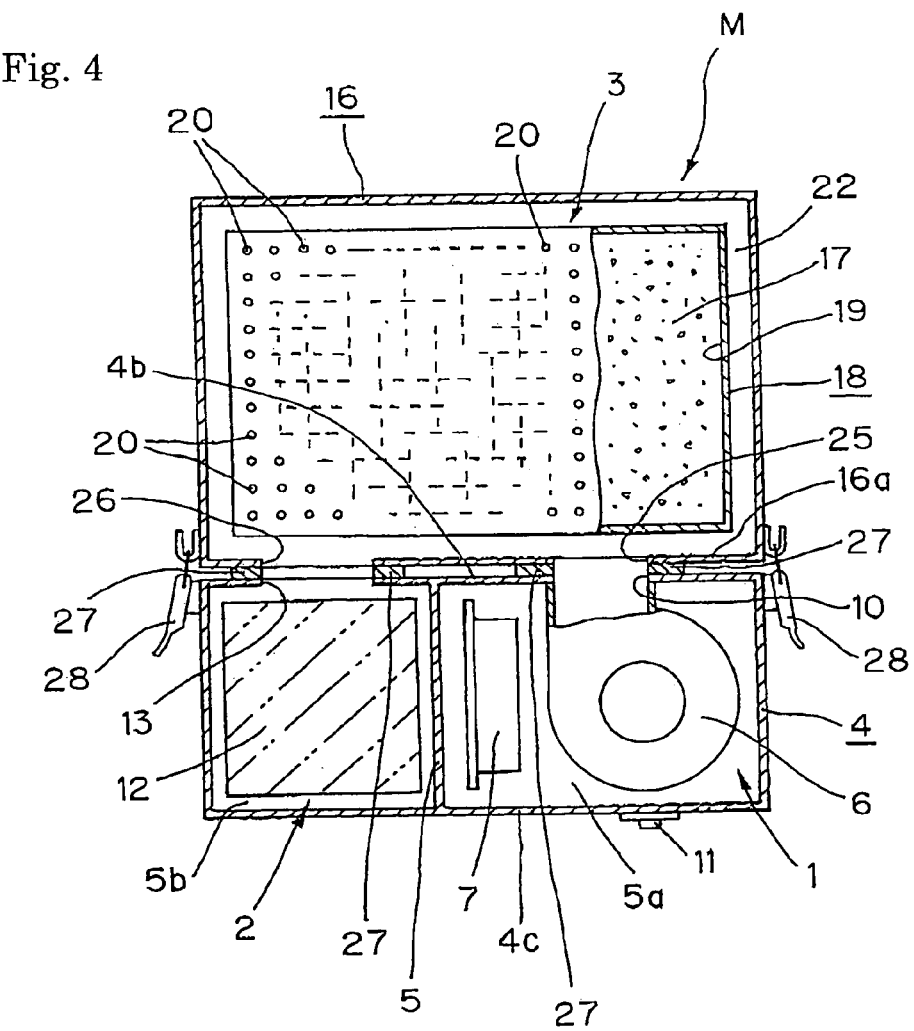
FIG. 4 is a transverse cross-sectional view of the above embodiment.

In reference to FIGS. 1-4, the first embodiment of the present invention is now described. FIG. 1 is a front view of a longitudinal section of the air-purifying device for the FOUP of the present invention. FIG. 2 is a right-side view of the longitudinal section of it. FIG. 3 is a left-side view of the longitudinal section of it. FIG. 4 is a transverse cross-sectional view of it.

As shown in FIGS. 1-4, the air-purifying device (M) for the FOUP comprises a fan-driving means 1, a dust-filtering means 2 for removing the dust, and a chemical-filtering means 3 for removing the moisture and chemical gases.

The fan-driving means 1 and the dust-filtering means 2 for removing the dust are respectively installed in the first compartment 5a and the second compartment 5b, which are made by dividing a first casing 4 shaped as a cube into two compartments.

The fan-driving means 1, which is installed in the first compartment 5a, has a fan 6 and drive unit 7 for driving it. A suction hole 8 is provided in the upper plate 4a of the first casing 4, corresponding to the first compartment 5a for the means 1, to suck the air 52 in the FOUP 51. A suction nozzle 9 is also provided. It encircles the suction hole 8. A supply hole 10 is provided in the upper part of the back plate 4b of the first casing 4, corresponding to the first compartment 5a for the means 1, to force the air 53 that is pressurized by the fan 6 into the chemical-filtering means 3 of a filter for removing the moisture and chemical gases. Further, a start-and-stop switch 11 is mounted on the outside of the front plate 4c of the first casing 4, which corresponds to the first compartment 5a for the means 1.

The dust-filtering means 2 for removing the dust that is in the second compartment 5b has a filter 12 to remove it. An intake hole 13 is made in the lower part of the back plate 4b of the first casing 4, corresponding to the second compartment 5b for the dust-filtering means 2, to extract purified air 54, from which the moisture and chemical gases have been removed, from the chemical-filtering means 3 for removing the moisture and chemical gases. Further, a discharge hole 14 is provided in the upper plate of the first casing 4, at the side of the dust-filtering means 2, to supply purified air 63, from which the dust has been removed by the filter 12, into the FOUP 51, and a discharge nozzle 15 that encircles the discharge hole 14 is also provided. Preferably, a high-efficiency filter may be employed as the filter 12 to remove the dust, but the filter is not limited to such a filter. The suction nozzle 9 and the discharge nozzle 15 are made at the points corresponding to the two breathing holes 58a and 58b respectively of the multiple holes that are made in the bottom plate of the FOUP 51, as described below.

The chemical-filtering means 3 for removing the moisture and chemical gases is in a second casing 16, shaped as a cube, and absorbs the moisture and chemical gases and stores them. The chemical-filtering means 3 is provided by a storage case 18, which contains spherical filter media 17, such as a zeolite or activated carbon.

A cube-shaped box made of metal such as aluminum is provided as the storage case 18. The box has a hollow cube-shaped space 19. Its thickness is about half of the depth of the second casing 16. It has a number of holes 20 on the surface of it, has projections on the central portion of its four exterior surfaces, and has the spherical filter 17 media in the hollow cube-shaped space 19.

The second casing 16 has concave portions on the central portions of its four internal surfaces that engage with the projections of the storage case 18. The storage case 18 is fixed in and splits the second casing 16 into an upper portion, below referred to as a first compartment 23, and a lower portion, below referred to as a second compartment 24.

An intake hole 25 is made in the upper part of the front plate 16a of the second casing 16, corresponding to the supply hole 10 of the first casing 4, to take the air 53 pressurized by the fan 6 of the means 1 into the first compartment 23. A supply hole 26 is provided in the lower part of the front plate 16a of the second casing 16, corresponding to the intake hole, to supply the air 54 from which the moisture and chemical gases have been removed by the spherical filter media 17. The air 53, pressurized by the fan 6, is led to the first compartment 23. It then enters the storage case 18 through the holes 20 on the upstream surface, contacts the spherical filter media 17, lets the moisture and chemical gases in the air 53 be absorbed, and then the air 53 enters the second compartment 24 through holes 20 on the downstream surface.

As shown in FIGS. 2 and 3, the first compartment 23 communicates with the means 1 and the second compartment 24 communicates with the dust-filtering means 2. However, alternatively, the first compartment 23 may communicate with the dust-filtering means 2 and the second compartment 24 may communicate with the means 1.

The fan-driving means 1 and the dust-filtering means 2 of the first casing 4 and the chemical-filtering means 3 of the second casing are joined. A gasket 27 lies between the supply hole 10, which is provided for the fan-driving means 1, and the intake hole 25, which is provided for the chemical filtering means 3. A gasket 27 also lies between the intake hole 13, which is provided for the dust-filtering means 2, and the supply hole 26, which is also provided for the chemical filtering means 3. These gaskets 27 encircle the holes 10, 13, 25, and 26 so as not to let the air leak from them. Further, the casings 4 and 16 are attached by latching the fasteners 28. The fasteners 28 are mounted on both sides of each of the casings 4 and 16 near the junction of the casings 4 and 16. Thus, the supply hole 10 and the intake hole 13, which are provided for the fan-driving means 1 and the dust-filtering means 2, respectively, are connected to the intake hole 25 and the supply hole 26 respectively, which are provided for the chemical filtering means 3.

The casings 4 and 16 are coupled by latching the fasteners 28, and they are decoupled by unlatching them. Since they are separable from each other, each device in each of the fan-driving means 1, dust-filtering means 2, and the chemical filtering means 3 can be easily repaired, inspected, and maintained.

Figure 5:
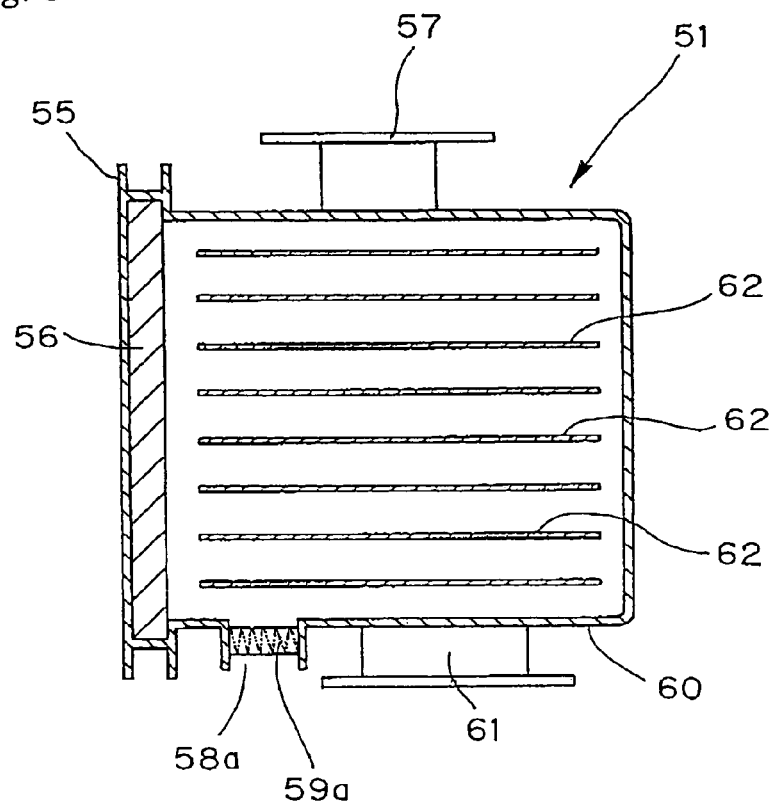
FIG. 5 is a longitudinal sectional view of the FOUP mounted on the air-purifying device of the present invention.
Figure 6:
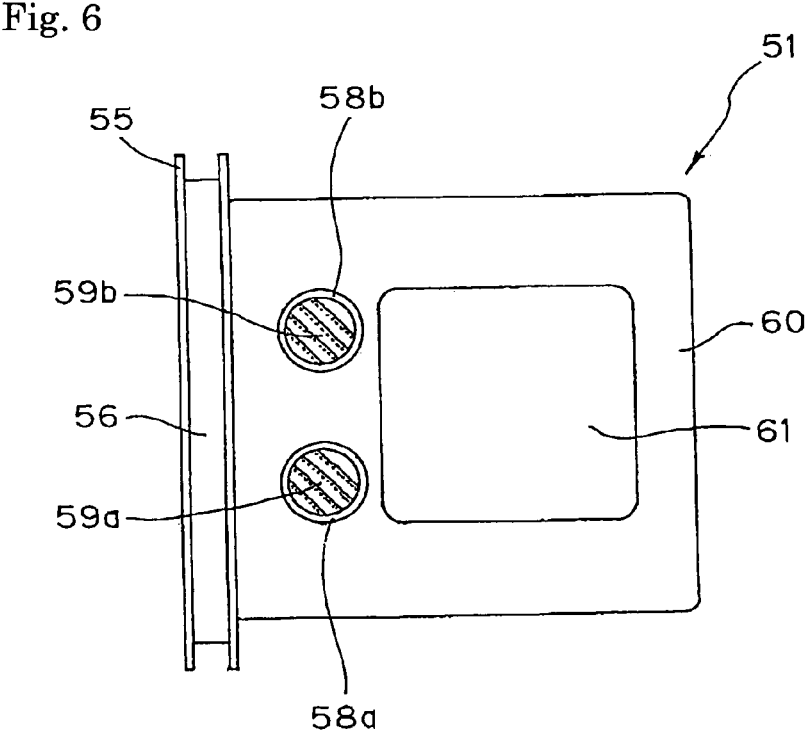
FIG. 6 is a bottom plan view of the air-purifying device of the present invention.
Figure 7:
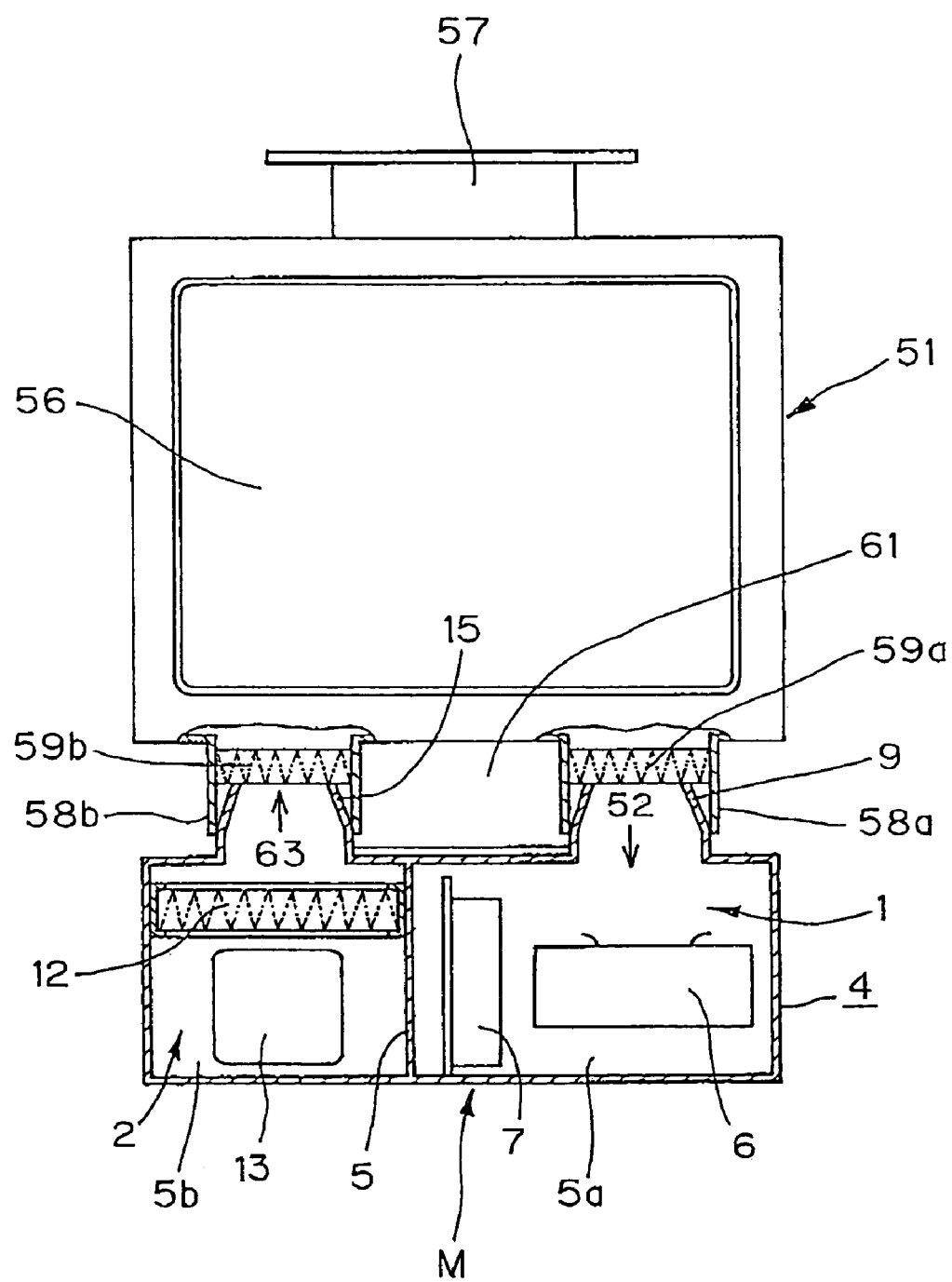
FIG. 7 is a front view of a partly longitudinal section of the air-purifying device of the present invention in use.

When the FOUP 51 is put to practical use it is put on the air-purifying device (M) of the present invention. Namely, as in FIGS. 5 and 6, the FOUP 51 comprises a flange portion 55 for a door 56, a hanging portion 57 for transport, and two breathing holes 58a and 58b. The breathing hole 58a and the breathing hole 58b are equipped with a filter 59a and 59b respectively. Further, the bottom plate 60 of the FOUP 51 has a support 61 to place the bottom plate on a platform (not shown). Wafers 62 are put in the FOUP 51.

The FOUP 51 is mounted on the air-purifying device (M), which comprises the above elements. When it is mounted on the air-purifying device (M) for the FOUP 51 with the support 61, the suction nozzle 9 and the discharge nozzle 15, which are provided on the fan-driving means 1 and the dust-filtering means 2, are inserted in the breathing holes 58a and 58b, which are made in the bottom plate 60 of the FOUP 51, and tightly connected. Some of the FOUPs 51 that are put to practical use have more than two breathing holes on the bottom plate 60. But the air-purifying device of the present invention uses just two breathing holes.

Preferably, the suction nozzle 9 and the discharge nozzle 15 are made of elastic materials such as rubber, and are cone-shaped. The diameter of the end is less than that of the base so that they can be inserted into the breathing holes 58a and 58b, and so that their inner edges can easily contact each other so as to maintain the sealing ability.

Now we discuss the functions of the air-purifying device of the present invention for the FOUP. First, the fan 6 in the fan-driving means 1 is activated, and it sucks the air 53 in the FOUP 51 through its breathing holes 58a and brings it into the fan-driving means 1 through the suction nozzle 9. The sucked air 53 is forced into the first compartment 23 of the chemical-filtering means 3 through the supply hole 10 and the intake hole 25 by the fan 6. Then it enters the storage case 18 through the holes 20 on the upstream surface and contacts the spherical filter media 17, and lets the moisture and chemical gases in it be absorbed, and then enters the second compartment 24 through holes 20 on the downstream surface.

The air 54 in the second compartment 24, from which the moisture and chemical gases have been removed, enters the dust-filtering means 2 through the supply hole 26 and the intake hole 13. The dust in the air is removed by the filter 12, and the air becomes purified air 63. The purified air 63 is caused to go into the FOUP 51 through the discharge nozzle 15 and the other breathing hole 58b.

Since the purified air 63 is supplied to the FOUP 51, which is pressurized by the air 63, entry of moisture and chemical gases from the atmosphere is prevented and the purity of the air in the FOUP 51 can be maintained. The above movement is repeated, and the air in the FOUP 51 is purified by circulating the air.

THE SECOND EMBODIMENT OF THE INVENTION

Figure 8:
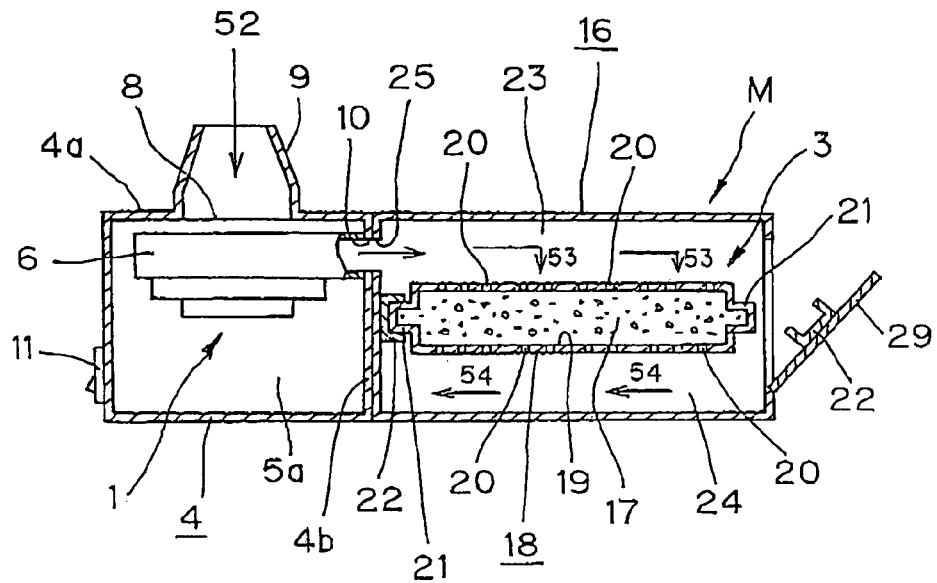
FIG. 8 is a right-side view of the longitudinal section of the second embodiment of the air-purifying device for the FOUP of the present invention.
Figure 9:
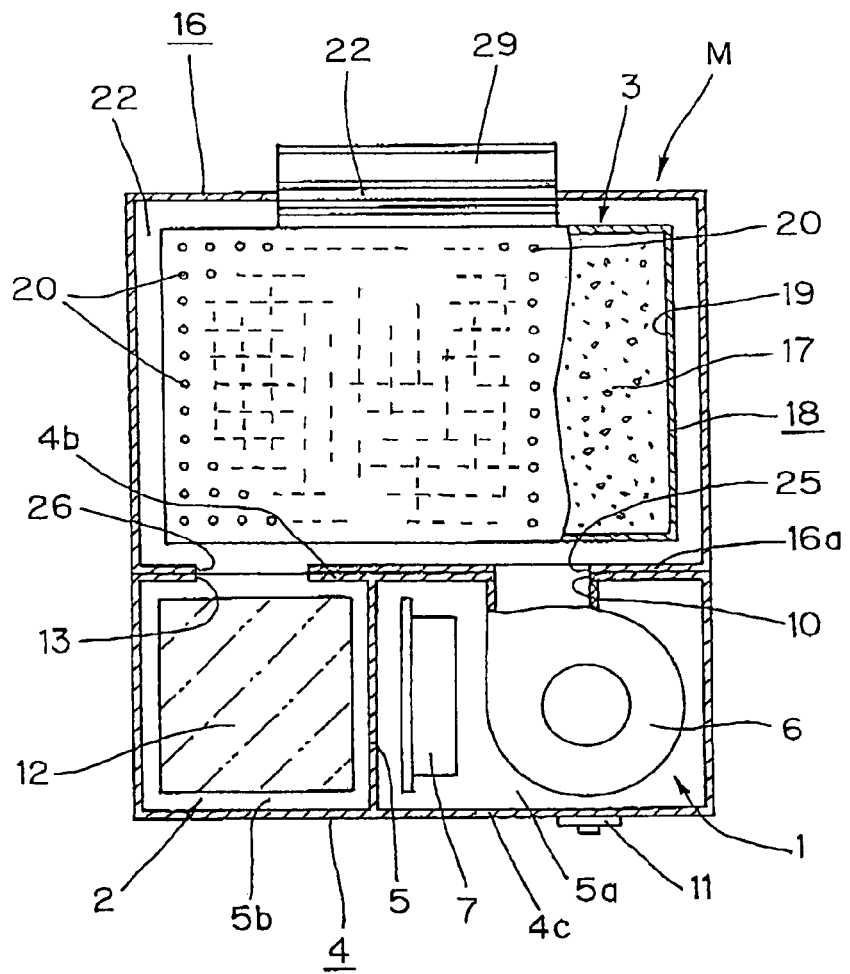
FIG. 9 is a transverse cross-sectional view of the above embodiment.

FIG. 8 is a right-side view of the longitudinal section of the second embodiment of the air-purifying device of the present invention. FIG. 9 is a transverse cross-sectional view of the above embodiment. While the air-purifying device (M) of the first embodiment is constructed such that the first casing 4, which contains the fan-driving means 1 and the dust-filtering means 2, and the second casing 16, which contains the chemical-filtering means 3, can be coupled or decoupled by latching or unlatching the fasteners 28 as in FIGS. 1-4, the air-purifying device of the second embodiment is constructed such that the casings 4 and 16, which contain the fan-driving means 1, the dust-filtering means 2, and the chemical-filtering means 3, are tightly joined as in FIGS. 8 and 9. The part 29 is a lid for drawing out or inserting the storage case 18 containing spherical filter media. The lid 29 is opened when the storage case 18 is drawn out or inserted into the casing.

Accordingly, the air-purifying device (M) of the second embodiment does not provide the gaskets 27 or the fasteners 28 that are provided on the device of the first embodiment. However, it does provide the lid 29, but the other components are the same as those of the first embodiment. The explanation of the functions of the second embodiment is omitted, because the components are substantially the same as those of the first embodiment and the purpose wherein it maintains the purity of the air by being circulated is the same as the purpose of the second embodiment.

What is claimed is:

1. An air-purifying device for a front-opening unified pod comprising:
   a first compartment having a suction nozzle and a fan-driving means that includes a fan and its drive unit;
   a second compartment coupled to the first compartment, the second compartment having a discharge nozzle and a dust-filtering means that includes a cleaning filter for removing dust; and
   a third compartment having an upper portion, a lower portion and a chemical-filtering means for removing moisture and chemical gases between the upper portion and the lower portion, the upper portion having an intake hole coupled to the first compartment and the lower portion having a supply hole coupled to the second compartment so that air passes from the first compartment through the intake hole into the third compartment and passes through the supply hole into the second compartment wherein the suction nozzle and the discharge nozzle are capable of connection to breathing holes of the front-opening unified pod, wherein the air is purified and its purity is maintained by being circulated between the front-opening unified pod and the air-purifying device by activating the air-purifying device, wherein the air in the front-opening unified pod is sucked via one of the breathing holes and enters the air-purifying device through the suction nozzle, wherein the air-purifying device removes the moisture, chemical gases, and dust from the air, and wherein then the purified air, from which the moisture, chemical gases, and dust have been removed, is again blown into the front-opening unified pod via the discharge nozzle and another one of the breathing holes.

2. An air-purifying device for a front-opening unified pod comprising:
   a first casing having a first compartment and a second compartment, the first compartment having a suction nozzle and a fan-driving means that includes a fan and its drive unit, and the second compartment coupled to the first compartment, the second compartment having a discharge nozzle and a dust-filtering means that includes a cleaning filter for removing dust; and
   a second casing having a chemical-filtering means that includes spherical filter media for removing moisture and chemical gases,
   wherein the first and second casings are coupled by latching fasteners, wherein the suction nozzle and the discharge nozzle are capable of connection to breathing holes of the front-opening unified pod, wherein air is purified and its purity is maintained by being circulated between the front opening unified pod and the air-purifying device by activating the air-purifying device, wherein the air in the front-opening unified pod is sucked via one of the breathing holes and enters the air-purifying device through the suction nozzle, wherein the air-purifying device removes moisture, chemical gases, and dust from the air, and wherein then the purified air, from which the moisture, chemical gases, and dust have been removed, is again blown into the front-opening unified pod via the discharge nozzle and another one of the breathing holes.

3. An air-purifying device for a front-opening unified pod comprising:
   a first casing having a first compartment and a second compartment, the first compartment having a suction nozzle and a fan-driving means that includes a fan and its drive unit, and the second compartment coupled to the first compartment, the second compartment having a discharge nozzle and a dust-filtering means that includes a cleaning filter for removing dust; and a second casing having a chemical-filtering means for removing moisture and chemical gases, wherein the first and second casings are joined, wherein the suction nozzle and the discharge nozzle are capable of connection to breathing holes of the front-opening unified pod, wherein air is purified, and its purity is maintained by being circulated between the front-opening unified pod and the air-purifying device by activating the air-purifying device, wherein the air in the front-opening unified pod is sucked via one of the breathing holes and enters the air-purifying device through the suction nozzle, wherein the air-purifying device removes the moisture, chemical gases, and dust from the air, and wherein then the purified air, from which the moisture, chemical gases, and dust have been removed, is again blown into the front-opening unified pod via the discharge nozzle and another one of the breathing holes.

* * * * *